United States Patent [19]

Jacoby, Jr. et al.

[11] Patent Number: 4,833,277
[45] Date of Patent: May 23, 1989

[54] WALL PLATE INSERT

[75] Inventors: Elliot G. Jacoby, Jr., Glenside; Noel Mayo, Philadelphia; Joel S. Spira, Coopersburg, all of Pa.

[73] Assignee: Lutron Electronics Co., Inc., Coopersburg, Pa.

[21] Appl. No.: 45,719

[22] Filed: Apr. 24, 1987

Related U.S. Application Data

[63] Continuation of Ser. No. 432,791, Oct. 4, 1982, abandoned.

[51] Int. Cl.[4] ............................................. H02G 3/14
[52] U.S. Cl. ...................................... 174/66; 220/241; 428/137; 428/119; 428/157
[58] Field of Search ............ 174/66, 67; 220/241, 220/242; 428/67, 79, 99, 131, 136, 192, 119, 120, 542.2, 137, 542.8, 157

[56] References Cited

U.S. PATENT DOCUMENTS 3,899,101  8/1975  Keating et al. ................ 174/66 X
4,255,637  3/1981  Matsuda ........................ 174/66 X

FOREIGN PATENT DOCUMENTS 321184  11/1929  United Kingdom ............. 220/242

Primary Examiner—Alexander S. Thomas
Attorney, Agent, or Firm—Schiller, Pandiscio & Kusmer

[57] ABSTRACT

A filler element or insert for installation in a decorator-type wall plate when the latter are used to cover mounting boxes containing standard electrical controls, the insert being a substantially rectangular element dimensioned to fit within the central opening in the wall plate. The insert in turn includes an aperture usually centrally disposed therein, the latter aperture being shaped and dimensioned to accommodate the extending or projecting portion of a desired electrical control. The insert also includes means disposed on its edge portion for providing a luminance mask or visual discontinuity between the front surface of the decorator plate and the front surface of the insert. Means are provided for securing the insert in the aperture in the wall plate.

1 Claim, 3 Drawing Sheets

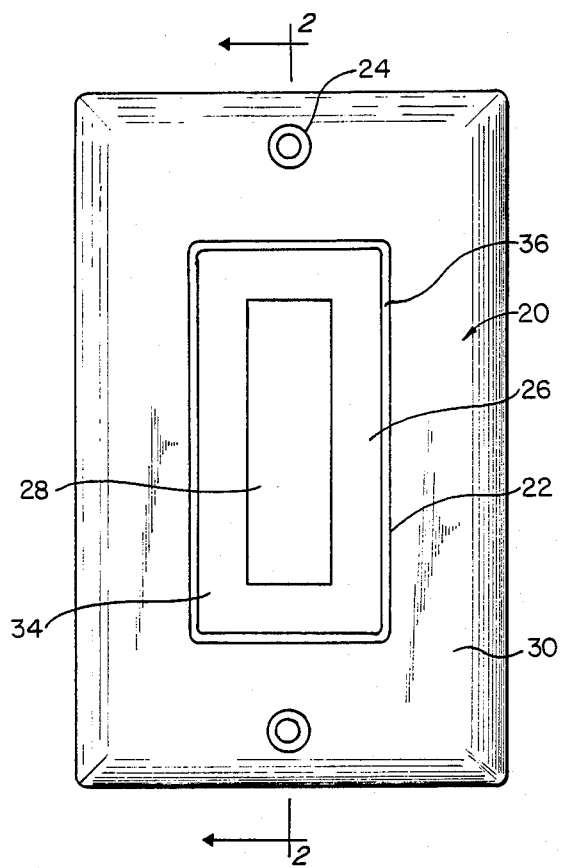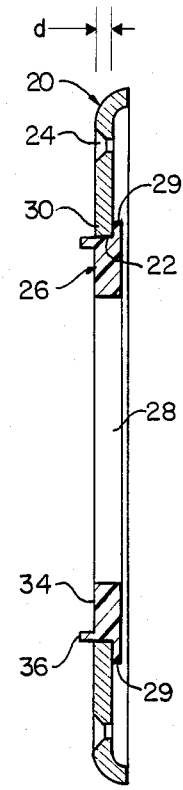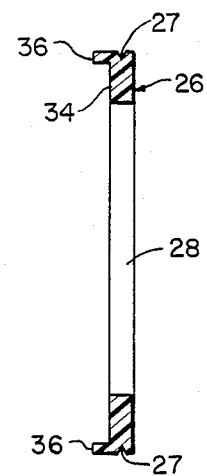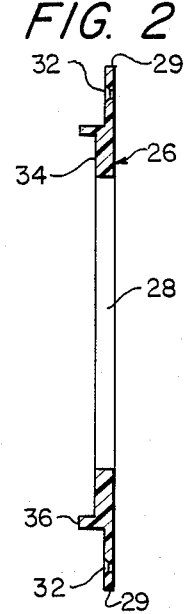
FIG. 1
FIG. 2
FIG. 3
FIG. 4

WALL PLATE INSERT

This is a continuation of co-pending application Ser. No. 432,791 filed on Oct. 4, 1982 now abandoned.

This invention relates to an insert for a wall plate for wall mounted electrical controls, receptacles and the like mounted in a wall box.

Particularly, the present invention is intended for use with the switch cover or wall plate of the type shown in STANDARD PUBLICATION NUMBER WD1-1979, Page 16, NEMA General Purpose Wiring Devices, National Electrical Manufacturers Association, Washington, D.C., generally a rectangularly shaped, dished cover approximately 2¾ inches by 4½ inches with a central aperture or opening, or multiples of such plate. Such a wall plate, commonly referred to as a decorator plate, is characterized in having a much larger opening (e.g., 1.31"×2.63") than the standard wall plate, thereby permitting the decorator wall plate to be used interchangably for electrical receptacles and for electrical control devices such as decorator switches. The prior standard cover or wall plate (as distinguished from the decorator plate) used for prior art standard switches generally will not properly fit an electrical receptacle nor would the standard wall plate for receptacles properly fit switches. The large opening in the new decorator wall plate is designed for and fits snugly around the new wide decorator switches, duplex receptacles and the like. When the decorator plate is installed over other devices such as the standard narrow toggle switch, slide dimmer or rotary switch, the combination of such device and decorator plate becomes unacceptable esthetically, and possibly dangerously exposes a surface of that electrical device, which surface should properly be covered.

Decorator wall switches and matching decorator plates for use therewith are currently available in a variety of colors, one of the most common of which is white. Because there is no true color standardization among the several manufacturers of decorator plates, the shades of color (including white) in which the plates are made substantially differ, i.e. the hue may be the same but the saturation differs. Inserts used to fill in the opening in the decorator plate to surround small projecting portions such as the shaft of a rotary electrical control, cannot be expected to match the several varieties of white in which the decorator plates are available, unless of course a matching insert is provided by the same manufacturer and is available to the purchaser.

Often, a wall box is mounted in a wall so that the plane of the edges of the front opening of the box is not flush with the wall surface as is should be. Additionally, decorator plates tend to differ in thickness from manufacturer to manufacturer if only by some small fractions of an inch. An ordinary insert used with the decorator plate is generally supported by the switch so that the facing or observable surface of the insert tends to be aligned by the orientation of the box. The position of the facing surface of the plate, when the latter is installed on the box, is usually however determined by the plane of the wall on which the plate rests. Consequently, there may be an angular mismatch between the surface of an insert and the plate such that one or more edges of the insert lies either above or below the corresponding surface of the plate. This mismatch is usually also unacceptable esthetically.

A primary object of the present invention is therefore to provide a filler element or insert for installation with decorator plates when the latter are used to cover boxes containing standard electrical controls, receptacles or the like which have a projecting portion (such as a toggle) much smaller than the plate opening, which insert overcomes the aforementioned problems. A specific object of the present invention is to provide an insert for installation with decorator plates whereby a mismatch in color or shade between the insert and the plate is not esthetically unacceptable. Another object of the present invention is to provide an insert of the type described where mismatches in height between the surface of the insert and the surface of the plate are not objectionable. The foregoing and other objects of the present invention are achieved by providing a rectangular insert which has a thickness equal to or greater than the thickness or depth of the plate with which it is to be used, the insert itself having at least one aperture dimensioned to accomodate the projecting portion of an electrical control or receptacle. Means are also provided for securing the insert in position in the plate opening. Importantly, means are disposed on the edges of the insert for providing a visual discontinuity or luminance mask between the respective surfaces of the plate and the insert when the latter is finally positioned in the plate opening.

Other objects of the invention will in part be obvious and will in part appear hereinafter. The invention accordingly comprises the product possessing the features, properties and relation of components which are exemplified in the following detailed disclosure, and the scope of the application of which will be indicated in the claims. For a fuller understanding of the nature and objects of the present invention, references should be had to the following detailed description taken in connection with the accompanying drawing wherein:

FIG. 1 illustrates in plan a decorator plate with an insert according the principles of the present invention; and FIG. 2 is a cross-section taken along the line 2—2 of FIG. 1;

FIG. 3 is a cross-section of an alternative form of insert of the present invention;

FIG. 4 is a cross-section taken along another alternative form of the insert of the present invention;

Figure 5:
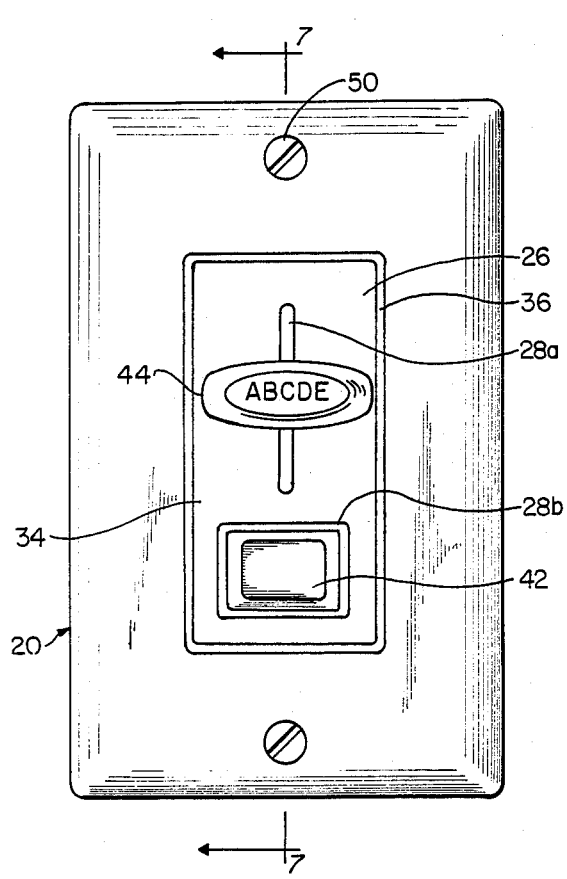
FIG. 5 is a plan view of a decorator plate having electrical controls mounted in an insert therein according to the priciples of the present invention.

Referring now to FIG. 1, there is shown a decorator wall plate 20 of the type hereinbefore described, the wall plate being generally of a rectangular configuration with a substantially rectangular aperture or opening 22 disposed centrally therein. It will be appreciated that the wall plate shown in FIG. 1 is typically of the type which is used with a duplex receptacle or a decorator wall witch, but the principles of the present invention are equally applicable to other decorator wall plates or switch covers which are useful with single receptacles and/or switches or electrical controls which are designed to fit. Plate 20 has the usual dual mounting screw holes 24 for accomodating screws for mounting the plate on a receptacle or control mounted in turn in a wall box. Particularly as shown in FIG. 2, when plate 20 is formed of metal sheet or high molecular weight polymers, the plate is usually dished so that the edge portions thereof are formed with a rounded bevel. Disposed within opening 22 is insert 26 formed according to the principles of the present invention. Insert 26 is a generally flat element with a substantially rectangular shape and is dimensioned to fit snugly within opening 22. Insert 26 also defines aperture 28 usually centrally disposed therein, aperture 28 being shaped and dimensioned to accomodate the extending or projecting portion of a desired or particular electrical control. As shown in FIG. 1 for example, aperture 28 is dimensioned to accomodate a standard toggle or manually operable lever projecting from a switch. It is understood however that aperture 28 may be any particular shape or size according to the electrical control to be accomodated. For example, aperture 28 can be dimensioned and shaped to accept the button of a push-button type switch or may be simply a circular hole dimensioned to accomodate the shank or shaft of either a rotary or linear dimmer, or of a rotary or turn-switch.

It will be seen, particularly in FIG. 2, that the thickness of insert 26 is equal to or greater than the thickness of plate 20 at opening 22, i.e. as shown at "d" in FIG. 2. This structural requirement insures that when the edge portion of the insert is an upstanding ridge as will be hereinafter described, the ridge will always project beyond the adjacent surface of the plate.

Means are provided for securing insert 26 within aperture 22. To this end, insert 26 is preferably dimensioned so as to fit snugly within aperture 22, and thus may be press-fitted. Alternatively, insert 26 may be made of a slightly resilient material such as a high molecular weight polymer, in which case, as shown particularly in FIG. 3, the insert is provided with narrow peripheral groove 27 so that it may be deformably snapped into aperture 22. In a preferred form, particularly as shown in FIG. 2, insert 26 is provided with a circumferential ridge or lip 29 adapted to butt against the underside of outer or facing surface 30 of plate 20 and may be thereby attached to the underside of plate 20 by adhesive or the like, by press-fit or by any other well-known means. Where insert 26 is provided with lip 29, the latter may also be appropriately apertured, as shown at 32 in FIG. 4, to accept fasteners such as screws which are intended to connect the insert to the frame of an electrical control means or the like mounted within a wall box, or alternatively to the plate per se.

Importantly, the present invention includes means 36 disposed on the edge portions of insert 26 for providing a luminance mask or visual discontinuity between front surface 30 of plate 20 and the front surface 34 of insert 26, surface 34 being that portion which is bounded by the aforementioned edge portions It is known that the psychological effectiveness of a light stimulus is altered by introduction of a similar stimulus at the same time. Such visual interaction is illustrated by fact that introduction of a third or inducing object between two other objects being matched for brightness will alter the match, keeping in mind that brightness is the psychological or perceived effect of viewing a given stimulus provided by the luminance of an object. The effect of such visual interaction is known as meta-contrast or masking The necessary visual discontinuity to provide masking can be achieved, for example, by disposing between adjacent outer surfaces of the insert and plate and on the edge portions of insert 26, frame or ridge 36 designed in one embodiment to project outwardly beyond the plane of surface 34 when insert 26 is properly positioned within aperture 22. The cross-sectional shape of ridge 36 may be varied and for example can be rectangular, rounded, rhomboid, triangular or the like. Alternatively, the visual discontinuity need not be a ridge but may be an edge inlay or painted stripe of contrasting luminance, or a groove which in effect is a reversal of the reentrant cross-section of ridge 36. The essential attribute of ridge 36 is that it psychologically masks variations in shade or luminance between the surface of the plate and the surface of the insert. For example, if both the plate and the insert are slightly different shades of white, the presence of ridge 36 as an upstanding frame will tend to throw a shadow (except in the rare instance where the light impinging on the wall plate is perpendicular to the plane of the front surface of the latter), and either the shadow or the surface of the discontinuity will provide the desired masking effect. It will be appreciated that this shadow will serve also to hide or reduce the effect of an angular mismatch between the planes of the adjacent respective surfaces of the plate and the insert. While a groove or stripe will provide a like, if not as strong, a luminance masking effect, they will not yield the desired shadowing, so the ridge embodiment is preferred.

Figure 6:
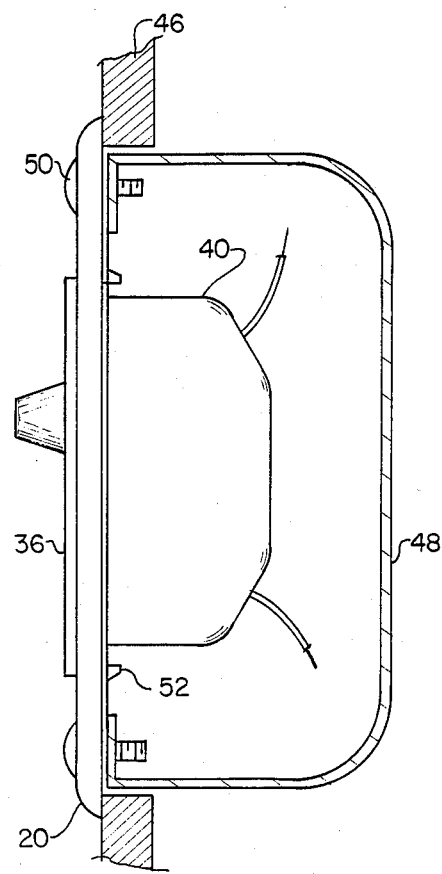
FIG. 6 is an side-elevation of the decorator plate of FIG. 5 showing the associated controls and mounting in cross-section.

Another embodiment of the present invention is shown in FIGS. 5 and 6 wherein decorator wall plate 20, as previously shown and described in connection with FIG. 1, accepts insert 26 connected to or formed as part of electrical control means 40. Insert 26 in this embodiment includes multiple apertures 28a and 28b for accepting several control elements such as switch 42 and removable control knob 44 for dimmers and the like, switch 42 and knob 44 being typically coupled to electrical control means 40. Means 36 thus serves as a frame to surround the manually operable levers or knobs of electrical control elements extending through apertures 28 and aid in locating the several control levers as well as to soften the angular appearance of the latter. For example, typically knob 44 is a manually linearly slidable or rotatable control member coupled to a dimmer circuit, while element 42 is typically a tumbler-switch lever, a turn-switch knob or the button of a push-button switch cooperating with the dimmer circuit to control a lighting circuit. Electrical control means 40 is shown mounted on conventional wall 46 in conventional wall box 48 as by screws 50, snaps 52 being provided to secure insert 26 to control means 40. As in the earlier described embodiment, means 36 also provides a luminance mask or visual discontinuity between front surface 34 and wall plate 20.

Figure 7:
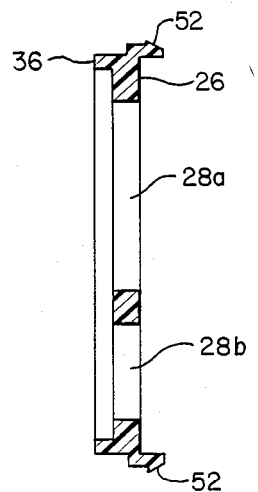
FIG. 7 is a cross-section taken along the line 7—7 of FIG. 5.

As shown in FIG. 7, insert 26 of FIG. 5 features snaps 52 for coupling insert 26 to control means 40. Due to the resilient nature of the polymer from which insert 52 is preferably formed, snaps 52 permit ready removal of insert from control means 40, for purposes of changing the color or design of the insert according as the user prefers. Multiple apertures 28a and 28b are so sized that once control knob 44 has been removed, insert 26 may simply be unsnapped from control means 40.

Figure 8:
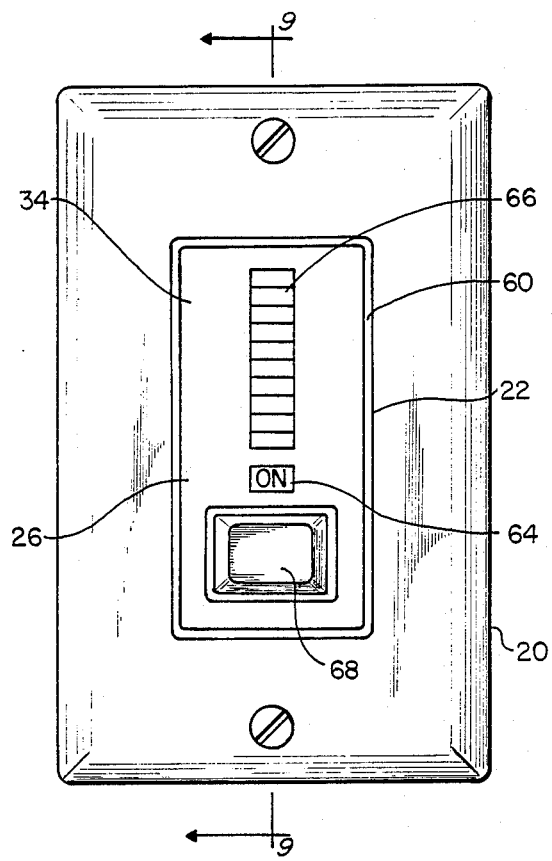
FIG. 8 is a plan view of a decorator plate having electrical controls and display in yet another form of insert according to the principles of the present invention.
Figure 9:
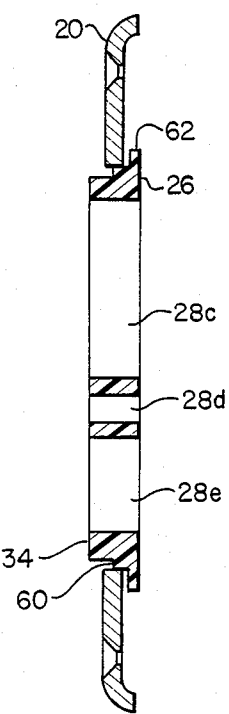
FIG. 9 is a cross-section taken along the line 9—9 of FIG. 8.

Yet another embodiment of the present invention is shown in FIGS. 8 and 9 wherein decorator wall plate 20 has openings 22 in which is located insert 26, the latter being dimensioned to fit snugly in opening 22 as previously described herein. A visual discontinuity is provided between the outside surface of plate 20 and surface 34 of insert 26 by groove 60, surface 34 being generally disposed to lie in a plane somewhat above the plane of the surface of plate 20. Groove 60 is bounded about its exterior edges by lip 62 formed about the periphery of insert 26 to mask from direct view any internal mechanisms of controls or switches. Multiple apertures 28c, 28d and 28e are provided in insert 26 to provide space through which can be extended or observed visual indicators or operators of control functions, such as on/off indicator light 64, LED bargraph 66 or control switch 68.

Since these and other changes may be made in the above apparatus without departing from the scope of the invention herein involved, it is intended that all matter contained in the above description or shown in the accompanying drawings shall be interpreted in an illustrative and not in a limiting sense.

What is claimed is:

1. An assembly for covering electrical control means or an electrical plug receptacle mounted in an electrical wallbox, said assembly comprising:
   a decorator plate having a covering surface, an aperture through said surface, and a selected thickness adjacent said aperture;
   an insert element removably inserted in said aperture and having a generally flat front surface and a thickness substantially equal to or greater than the thickness of said plate at said aperture, said element being dimensioned to extend through and fit within said aperture in said decorator plate, said element being substantially rigidly affixable to said electrical control means or receptacle;
   an opening through said element, said opening being dimensioned to provide access to a portion of said electrical control means or receptacle; and
   said element including psychological mask means formed on outer edge portions of said element for providing psychological masking of mismatches between the planes or shades of color of said front surface of said element and said covering surface of said plate when said element is inserted in said aperture, said psychological mask means comprising a groove circumferentially around said outer edge portions of said element.

* * * * *